US007184965B2

(12) United States Patent
Fox et al.

(10) Patent No.: US 7,184,965 B2
(45) Date of Patent: Feb. 27, 2007

(54) SYSTEMS AND METHODS FOR RECOMMENDING BUSINESS DECISIONS UTILIZING WEATHER DRIVEN DEMAND DATA AND OPPORTUNITY AND CONFIDENCE MEASURES

(75) Inventors: Frederic Fox, Berwyn, PA (US); Mike Kowa, Glenmoore, PA (US); Michael Willen, Thorndale, PA (US); Paul Walsh, Downingtown, PA (US); Doug Pearson, Mohnton, PA (US); David Estornell, Lincoln University, PA (US)

(73) Assignee: Planalytics, Inc., Wayne, PA (US)

( * ) Notice: Subject to any disclaimer, the term of this patent is extended or adjusted under 35 U.S.C. 154(b) by 0 days.

(21) Appl. No.: 10/695,445

(22) Filed: Oct. 29, 2003

(65) Prior Publication Data

US 2005/0096947 A1 May 5, 2005

(51) Int. Cl.
G06F 9/44 (2006.01)
(52) U.S. Cl. .......................................................... 705/7
(58) Field of Classification Search .................... 705/7, 705/8, 10
See application file for complete search history.

(56) References Cited

U.S. PATENT DOCUMENTS

| | | | |
|---|---|---|---|
| 3,808,410 | A | 4/1974 | Schlesinger |
| 4,015,366 | A | 4/1977 | Hall, III |
| 4,040,629 | A | 8/1977 | Kelly |
| 4,218,755 | A | 8/1980 | Root |
| 4,342,125 | A | 8/1982 | Hodge |
| 4,580,814 | A | 4/1986 | Berler |
| 4,626,992 | A | 12/1986 | Greaves et al. |
| 4,642,775 | A | 2/1987 | Cline et al. |
| 4,766,539 | A | 8/1988 | Fox |

(Continued)

FOREIGN PATENT DOCUMENTS

| | | |
|---|---|---|
| DE | 41 14 584 A1 | 11/1991 |
| FR | 2 751 774 | 7/1996 |
| FR | 2 732 477 | 10/1996 |
| JP | 4-135271 | 5/1992 |
| JP | 9-128411 | 5/1997 |
| JP | 10-332840 | 12/1998 |
| WO | WO 94/16394 | 7/1994 |
| WO | WO 98/22899 | 5/1998 |

OTHER PUBLICATIONS

Fox, Frederic, Weather—The next retail frontier Discount Merchandiser, Oct. 1993, vol. 33, No. 10.*

(Continued)

*Primary Examiner*—Romain Jeanty
*Assistant Examiner*—Scott L. Jarrett
(74) *Attorney, Agent, or Firm*—Sterne, Kessler, Goldstein & Fox, PLLC

(57) ABSTRACT

Systems and methods to generate business recommendations for specific business actions based on weather element forecasts and known relationships between a business activity and weather elements are provided. The system includes a confidence level filter, an opportunity matrix filter, a weather decision point generator, a business rule recommendation engine and a business rule knowledge database. Methods to generate a business recommendation for a business activity are also provided. The methods include receiving weather driven demand data, assigning opportunity measures to each of the data points, identifying weather decision points based on opportunity measures, and applying business weather rules to the weather decision points to generate business recommendations. In a further feature, a weather element relationship and/or a weather element forecast confidence level is assigned to each data point within the weather driven demand data. These confidence levels are then factored in to determine weather decision points.

15 Claims, 6 Drawing Sheets

U.S. PATENT DOCUMENTS

| | | | |
|---|---|---|---|
| 4,784,150 A | 11/1988 | Voorhies et al. | |
| 5,063,506 A | 11/1991 | Brockwell et al. | |
| 5,128,861 A | 7/1992 | Kagami et al. | |
| 5,128,862 A | 7/1992 | Mueller et al. | |
| 5,130,925 A | 7/1992 | Janes et al. | |
| 5,140,523 A | 8/1992 | Frankel et al. | |
| 5,168,445 A | 12/1992 | Kawashima et al. | |
| 5,189,606 A | 2/1993 | Burns et al. | |
| 5,208,665 A | 5/1993 | McCalley et al. | |
| 5,237,496 A | 8/1993 | Kagami et al. | |
| 5,250,941 A | 10/1993 | McGregor et al. | |
| 5,253,165 A | 10/1993 | Leiseca et al. | |
| 5,253,181 A | 10/1993 | Marui et al. | |
| 5,263,167 A | 11/1993 | Conner, Jr. et al. | |
| 5,283,865 A | 2/1994 | Johnson | |
| 5,295,064 A | 3/1994 | Malec et al. | |
| 5,295,069 A | 3/1994 | Hersey et al. | |
| 5,309,355 A | 5/1994 | Lockwood | |
| 5,342,144 A | 8/1994 | McCarthy | |
| 5,377,095 A | 12/1994 | Maeda et al. | |
| 5,444,820 A | 8/1995 | Tzes et al. | |
| 5,491,629 A * | 2/1996 | Fox et al. | 702/3 |
| 5,504,675 A | 4/1996 | Cragun et al. | |
| 5,521,813 A * | 5/1996 | Fox et al. | 705/8 |
| 5,654,886 A | 8/1997 | Zereski, Jr. et al. | |
| 5,673,366 A | 9/1997 | Maynard et al. | |
| 5,692,233 A | 11/1997 | Garman | |
| 5,712,985 A * | 1/1998 | Lee et al. | 705/7 |
| 5,740,549 A | 4/1998 | Reilly et al. | |
| 5,753,784 A | 5/1998 | Fischer et al. | |
| 5,768,586 A | 6/1998 | Zweben et al. | |
| 5,787,283 A | 7/1998 | Chin et al. | |
| 5,796,611 A | 8/1998 | Ochiai et al. | |
| 5,796,932 A * | 8/1998 | Fox et al. | 707/104.1 |
| 5,832,456 A * | 11/1998 | Fox et al. | 705/10 |
| 5,848,378 A | 12/1998 | Shelton et al. | |
| 5,855,006 A | 12/1998 | Huemoeller et al. | |
| 5,870,302 A | 2/1999 | Oliver | |
| 5,884,286 A | 3/1999 | Daughtery, III | |
| 5,909,671 A | 6/1999 | Byford et al. | |
| 5,946,662 A | 8/1999 | Ettl et al. | |
| 5,974,395 A | 10/1999 | Bellini et al. | |
| 5,978,738 A | 11/1999 | Brown | |
| 5,979,363 A | 11/1999 | Shaar | |
| 5,983,200 A | 11/1999 | Slotznick | |
| 5,999,882 A | 12/1999 | Simpson et al. | |
| 6,002,863 A | 12/1999 | Sheer et al. | |
| 6,009,407 A * | 12/1999 | Garg | 705/10 |
| 6,012,834 A | 1/2000 | Dueck et al. | |
| 6,014,606 A | 1/2000 | Tu | |
| 6,018,640 A | 1/2000 | Blackman et al. | |
| 6,021,402 A | 2/2000 | Takriti | |
| 6,035,285 A | 3/2000 | Schlect et al. | |
| 6,061,662 A | 5/2000 | Makivic | |
| 6,067,525 A | 5/2000 | Johnson et al. | |
| 6,104,582 A | 8/2000 | Cannon et al. | |
| 6,108,662 A | 8/2000 | Hoskins et al. | |
| 6,144,944 A | 11/2000 | Kurtzman et al. | |
| 6,151,582 A | 11/2000 | Huang et al. | |
| 6,173,276 B1 | 1/2001 | Kant et al. | |
| 6,188,960 B1 | 2/2001 | Baron et al. | |
| 6,216,109 B1 | 4/2001 | Zweben et al. | |
| 6,240,369 B1 | 5/2001 | Foust | |
| 6,263,321 B1 | 7/2001 | Daughtery, III | |
| 6,298,285 B1 | 10/2001 | Addink et al. | |
| 6,298,307 B1 | 10/2001 | Murphy et al. | |
| 6,317,686 B1 | 11/2001 | Ran | |
| 6,339,747 B1 | 1/2002 | Daly et al. | |
| 6,341,287 B1 | 1/2002 | Sziklai et al. | |
| 6,356,842 B1 | 3/2002 | Intriligator et al. | |
| 6,397,162 B1 | 5/2002 | Ton | |
| 6,405,134 B1 | 6/2002 | Smith et al. | |
| 6,405,179 B1 | 6/2002 | Rebane | |
| 6,418,417 B1 | 7/2002 | Corby et al. | |
| 6,453,215 B1 | 9/2002 | Lavoie | |
| 6,453,216 B1 | 9/2002 | McCabe et al. | |
| 6,496,780 B1 | 12/2002 | Harris et al. | |
| 6,498,987 B1 | 12/2002 | Kelly et al. | |
| 6,505,123 B1 | 1/2003 | Root et al. | |
| 6,535,817 B1 | 3/2003 | Krishnamurti | |
| 6,581,008 B2 | 6/2003 | Intriligator et al. | |
| 6,584,447 B1 * | 6/2003 | Fox et al. | 705/10 |
| 6,591,255 B1 * | 7/2003 | Tatum et al. | 706/25 |
| 6,654,689 B1 | 11/2003 | Kelly et al. | |
| 6,753,784 B1 | 6/2004 | Sznaider et al. | |
| 6,985,837 B2 | 1/2006 | Moon et al. | |
| 7,031,927 B1 | 4/2006 | Beck et al. | |
| 7,069,232 B1 * | 6/2006 | Fox et al. | 705/10 |
| 7,080,018 B1 * | 7/2006 | Fox et al. | 705/1 |
| 7,103,560 B1 * | 9/2006 | Fox et al. | 705/10 |
| 2002/0026284 A1 | 2/2002 | Brown | |
| 2002/0032644 A1 | 3/2002 | Corby et al. | |
| 2002/0038217 A1 | 3/2002 | Young | |
| 2002/0084900 A1 | 7/2002 | Peterson et al. | |
| 2002/0091692 A1 * | 7/2002 | Yoshida et al. | 707/9 |
| 2002/0107638 A1 | 8/2002 | Intriligator et al. | |
| 2002/0130899 A1 | 9/2002 | Ryan et al. | |
| 2002/0133385 A1 | 9/2002 | Fox et al. | |
| 2002/0178077 A1 | 11/2002 | Katz et al. | |
| 2002/0194113 A1 * | 12/2002 | Lof et al. | 705/37 |
| 2002/0194148 A1 * | 12/2002 | Billet et al. | 706/62 |
| 2003/0004780 A1 * | 1/2003 | Smith et al. | 705/10 |
| 2003/0107490 A1 | 6/2003 | Sznaider et al. | |
| 2003/0200027 A1 | 10/2003 | Root et al. | |
| 2004/0215394 A1 * | 10/2004 | Carpenter et al. | 702/3 |
| 2004/0225556 A1 * | 11/2004 | Willen et al. | 705/10 |
| 2004/0230519 A1 * | 11/2004 | Parker | 705/37 |
| 2005/0096947 A1 | 5/2005 | Fox et al. | |
| 2005/0154531 A1 | 7/2005 | Kelly et al. | |
| 2005/0177411 A1 * | 8/2005 | Schuhn | 705/10 |

OTHER PUBLICATIONS

Robins, Gary, Tracking sales climate Stores, Nov. 1993, vol. 75, No. 11, pp. 52-54.*

Vogelstein, Fred, Corporate America loves the weather: why companies pay for next years forecast U.S. News & World Report, Apr. 13, 1998, vol. 124, No. 14.*

Cawthorn, Chris, Weather as a strategic element in demand chain planning Journal of Business Forecasting Methods & Systems, Fall 1998, vol. 17, No. 3.*

Baker, Stacy, Only the weatherman knows (but so can you) Apparel Industry Magazine, Jun. 1999, vol. 60, No. 6, pp. 16-18.*

Planalytics Introduces Three Planning Products at Retail Systems 2001 PR Newswire, Jun. 5, 2001.*

Demantra, Planalytics Offer Joint Solution Business Wire, Aug. 20, 2001.*

Taming Weather's Unpredictable Impact Retail Merchandiser, Apr. 2002, vol. 42, No. 4.*

Leung K.S. et al., Fuzzy Concepts in Expert Systems IEEE, Sep. 1988.*

Prior, John, Weather Intelligence: the new secret service Food Manufacture, vol. 69, No. 5, May 1994.*

Cawthorn, Chris, Weather As A Strategic Element in Demand Chain Planning The Journal of Business Forecasting Methods & Systems, vol. 17, No. 3, Fall 1998.*

Shutovich, Christina, When it rains, wipers pour profits: Retailers need to prepare for customers during a downpour Aftermarket Business, vol. 109, No. 12, Dec. 1999.*

Cawthorn, Christopher, Sunny today, sales tomorrow—clothing industry Bobbin, May 1999.*

McNeeley, Trent, High-tech weather service aids business planning TechRepublic.com, Jan. 20, 2000.*

Villano, Matt, A Smile Makes a Lousy Umbrella CIO Magazine, Mar. 15, 2000.*
Impact SR from Planalytics Gives Retailers New Weapon Against Weather PR NewsWire, Sep. 14, 2000.*
Taming Weather's Unpredictable Impact Retail Merchandiser, vol. 42, No. 4, Apr. 2002.*
Weather for sale Daily Record, Jun. 22, 2002.*
Corby, Paul M., Weather volatility and power demand Power Economics, vol. 6, No. 7, Jul./Aug. 2002.*
SmartCorp.com Web Pages Smart Software, Inc., May 2000-Jul. 2001, Retrieved from Archive.org Dec. 20, 2005.*
Lucas, Peter, Certainty-Factor-Like Structures in Bayesian Networks Advances in Artificial Intelligence, AL*IA99, 1999.*
Makridakis, Spyros et al., Forecasting Methods and Applications—Third Edition John Wiley & Sons, 1998, ISBN: 0-471-53233-9.*
Shim, Jae K., Strategic Business Forecasting—Revised Edition CRC Press, 2000, ISBN: 1-57444-251-1.*
Retailers use sales forecasts to get in front of the weather National Home Center News, Nov. 20, 2000, vol. 26, No. 21, p. 8.*
Chen, P.C., "Supercomputer-Based Visualization Systems Used for Analyzing Output Data of a Numerical Weather Prediction Model," ACM, pp. 296-309 (1990).
Riordan, D. and Hansen, B.K., "A Fuzzy case-based system for weather prediction," *Engineering Intelligent Systems*, vol. 10, No. 3, CRL Publishing Ltd., pp. 139-146 (Sep. 2002).
English Abstract Page for Japanese Patent Publication No. 10096790, 1 page, data supplied from the esp@cenet database.
English Abstract Page for Japanese Patent Publication No. 11258359, 1 page, data supplied from the esp@cenet database.
http://www.irrigation.com—as Archived on Feb. 19, 1999.—A trade web site on golf, agriculture and landscape irrigation.
Helfrich, Greg; Haas, Greg; Dubin Gary, "Software developed for disinfection rule compliance", Water Engineering & Management, 1993.
Erickson, Paul, "Determination of Minimum Pool Level Quabbin Reservoir on the Basis of Water Quality Constraints", 1996.
Price et al. "Adapting a Patch Model to Simulate the Sensitivity of Central-Canadian Boreal Ecosystems to Climate Variability." Journal of Biogeography, vol. 26, No. 5, pp. 1101-1113, Sep. 1999.
Reynolds, C.S. "The Ecosystems Approach to Water Management" (abstract only). Journal of Aquatic Ecosystem Stress and Recovery, vol. 2, No. 1, Mar. 1993.
Risser, Paul G. "The Status of the Science Examining Ecotones." BioScience, vol. 45, No. 5, p. 318(8), May 1995.
Kickert et al. "Predictive Modeling of Effects Under Global Change." Environmental Pollution 100 (103), pp. 87-132, 1999.
International Search Report issued Jan. 8, 2001 for PCT/US01/11915, 4 pages.
Banham, R., "Reinsurers Seek Relief in Computer Predictions", Aug. 1993, pp. 14-16, 18-19, XP002082269, p. 14, col. 1, line 1, col. 2, line 29.
Gagne, James, 'Fair-weather trends', May 1997, American Demographics, pp. 1-5.
Gotschall, Mary G., "Bullish on weather," *Electric Perspectives*, Washington, vol. 23, No. 5, p. 30, 8 pgs (Sep./Oct. 1998).
http://www.bysb.com/sponsors/weathr.htm.
Hunter, R., "Forecast for Weather Derivatives: Hot Derivatives Strategy," May 1999, pp. 1-6, XP002133864, as printed from http://derivatives.com/magazine/arrive/1998/0598feal.asp> p. 1, line 1—p. 6, line 9.
"Japan-US Business Report, American Companies in Japan," *Software and Information Services*, vol. 1997, No. 335, Aug. 31, 1997.
Karmin, Monroe W., "Inflation, Jobs and Interest Rates: Dangerous Territory," *U.S. News & World Report*, vol. 108, No. 19., p. 50, May 14, 1990.
Lucchetti, A., "Cold Winter On the Way? Some bet on it," *Wall Street Journal*, Nov. 6, 1997.
Malliaris, M., "Beating the Best: A Neutral Network Challenges the Black-Scholes Formula," *Proceedings of the Conference on Artificial Intelligence for Applications*, US, Los Alamitos, IEEE Comp. Soc. Press, 1993, pp. 445-449, XP000379639, ISBN: 0-8186-3840-0, p. 445, col., 1, line 16, p. 446, col. 1, line 17.

"Microsoft Expedia Travel Services Debuts on the Web," PR Newswire, Oct. 22, 1996.
Ojala, Marydee, "The dollar sign: Weather databases online," database, vol. 18, No. 1, pp. 72-76, Feb./Mar. 1995.
"Origins of Option Pricing Techniques", "The Black and Scholes Model", "The Black and Scholes Model" and "Graphs of the Black Scholes Model", as printed from http://bradley.bradley.edu/.about.arr/bsm, Apr. 9, 1997, (8 pages).
Pizano, A. et al., "Automatic Generation of Graphical User Interfaces for Interactive Database Applicaitons," *Proceedings of the 1993 International Conference on Information and Knowledge Management*, Association for Computing Machinery, pp. 344-355 (Nov. 1993), XP009035258.
Rao, S.R.;Thomas, Edward G; Javalgi, Rajshekhar G., 'Activity Preferences and Trip-Planning Behavior of the U.S. Outbound Pleasure Travel Market', Winter, 1992, Journal of Travel Research, pp. 1-12.
Schwartz, S., "Modeling tools aid in financial risk management," *Insurance & Technology*, vol. 21, No. 4, pp. 20-21 (Apr. 1996).
"Skyline Multimedia Entertainment, Inc. Announces Co-Marketing Pact With Internet's InfoSpace.com; Deal Marks Theme Entertainment Company's Expansion Into Tour Industry Services," Business Wire, Sep. 4, 1998.
Stix, G., "A Calculus of Risk," *Scientific American*, pp. 92-97 (May 1998).
Studwell, A., "Weather Derivatives," $11^{th}$ *Conference on Applied Climatology*, Jan. 10-15, 1999, pp. 36-40, XP00089822, p. 36, col. 1, line 1-p. 40, col. 1, line 33.
Turvey, Calum G., "Weather Derivatives and Specific Event Risk," *Proceedings of the 1999 American Agricultural Economics Association Annual Meeting*, American Agricultural Economics Association (Aug. 1999).
Turvey, Calum, "Weather Derivatives for Specific Event Risks in Agriculture," *Review of Agricultural Economics*, American Agricultural Economics Association, vol. 23, No. 2, pp. 333-351 (Spring/Summer 2001).
Upbin, B., "Betting against God," *Forbes*, vol. 162, No. 1, p. 108(1) (Jul. 6, 1998).
'Urilicorp's Aquila energy to Greatly Expand it's Weather Hedging Products', Nov. 20, 1997, McGraw-Hill Publications, vol. 17, No. 1, p. 4.
"WeatherPlanner Introduces Weather Forecasting Service for Consumers and Small Businesses," PR Newswire, Nov. 11, 1997.
"WeatherPlanner Introduces Weather Forecasting Service for Skiers; Revolutionary Planning Tool Provides Forecasts up to 12 Months in Advance," PR Newswire, Dec. 12, 1997.
"WeatherPlanner Introduces Weather Forecasting Service for Vacationers; Revolutionary Planning Tool Provides Forecasts up to 12 Months in Advance," PR Newswire, Mar. 19, 1998.
"WeatherPlanner Introduces Weather Forecasting Service to Aid Brides in Planning Weddings and Honeymoons," PR Newswire, Dec. 9, 1997.
"WeatherPlanner Offers Weather Forecasting Service for Outdoor Enthusiasts; Weather Forecast Now Available up to 12 Months in Advance," PR Newswire, Mar. 6, 1998.
"WeatherPlanner Tees Up Weather Forecasting Service for Golfers; Weather Forecasts Now Available up to 12 Months in Advance," PR Newswire, May 5, 1998.
"Web WeatherPlanner Site for Weather Predictions," Newsbytes News Network, Dec. 12, 1997.
Williams, Michael et al., "Natural Gas Trends," Railroad Commission of Texas Gas Services Division Regulatory Analysis & Policy Section, Jul. 28, 2003.
www.intellicast.com, Screen Print, Jul. 4, 1998.
wysiwyg://171/http://www.aquilaenergy.com/northamerica/about/.
English Abstract of French Patent Publication No. 2 751 774, 1 page, data supplied from the esp@cenet database.
English Abstract of Japanese Patent Publication No. 9-128411, 1 page, data supplied from the esp@cenet database.
English Abstract Page for Japanese Patent Publication No. 10332840, 1 page, data supplied from the esp@cenet database.
International Search Report from PCT Appl. No. PCT/US93/11005, 6 pages, mailed Jun. 27, 1994.

International Search Report from PCT Appl. No. PCT/US95/00618, 5 pages, mailed May 3, 1995.
International Search Report from PCT Appl. No. PCT/US95/02557, 4 pages, mailed Jun. 8, 1995.
International Search Report from PCT Appl. No. PCT/US97/01075, 5 pages, mailed May 14, 1997.
International Search Report from PCT Appl. No. PCT/US99/23452, 5 pages, mailed Jun. 4, 2000.
International Search Report from PCT Appl. No. PCT/US04/32440, 3 pages, mailed May 27, 2005.
Best, D.L. and Pryor, S.P., *Air Weather Service Model Output Statistics System Project Report*, United States Air Force, Entire Report submitted (Oct. 1983).
*Demand Modeling & Forecasting System Product Description*, Printed from DIALOG File No. 256, 1 page (Apr. 1989—Product Release Data).
*Down to Earth Sales Analysis 3.1 Product Description*, Printed from DIALOG File No. 256, 1 page (Apr. 1989—Product Release Date).
Hurrell, M., "The Weather Business," *Intercity*, pp. 29, 31 and 32 (Feb. 1991).
*IMREX Demand Forecasting System Product Description*, Printed from DIALOG File No. 256, 1 page (1984—Product Release Date).
*The Weather Initiative*, (Brochure), The Met Office, 23 pages (1990).
*Microsoft Excel User's Guide*, Microsoft Corporation, pp. 280-281, 596-601 and 706-709 (1993).
Brennan Peter J., "Portfolio Managers Weather Global Risk Management Challenge," *Wall Street Computer Review*, Dealers Digest Inc., vol. 7, No. 1, pp. 20-22, 24, 54, 56, Oct. 1989.
Jensen, Cary and Anderson, Loy, *Harvard Graphics: The Complete Reference*, Osborne McGraw-Hill, pp. 5, 16, 17, 126-129, 737-747, 1990.

Cave, Tom, "Weather Service Is a Boon To System Dispatchers," *Transmission & Distribution*, vol. 43, No. 8, pp. 165, 166, 168-169, Aug. 1991.
Mitchell et al., "Where No Computer Has Gone Before: Massively Parallel Processing Promises Unparalleled Performance," McGraw-Hill Inc., *Business Week*, pp. 80-84, 88, Nov. 25, 1991.
Engle, R.F. et al, "Modelling Peak Electricity Demand," John Wiley & Sons, Ltd., *Journal of Forecasting*, vol. 11, No. 3, pp. 241-251, Apr. 1992.
*Microsoft Access™ User's Guide*, Microsoft Corporation, pp. 22-27, 36-39, 327-335, 370-373, 395-447, 1992.
Ehrenberg, A.S.C. et al., "The After Effects of Price-Related Consumer Promotions," Advertising Research Foundation, Inc., *Journal of Advertising Research*, vol. 34, No. 4, pp. 11-21, Jul./Aug. 1994.
Patent Abstracts of Japan, JP 1236396, published Sep. 21, 1989.
Patent Abstracts of Japan, JP 1259488, published Oct. 17, 1989.
Patent Abstracts of Japan, JP 2268396, published Nov. 2, 1990.
Patent Abstracts of Japan, JP 2299059, published Dec. 11, 1990.
Patent Abstracts of Japan, JP 4077896, published Mar. 11, 1992.
Patent Abstracts of Japan, JP 4135271, published May 8, 1992.
Patent Abstracts of Japan, JP 4353970, published Dec. 8, 1992.
Patent Abstracts of Japan, JP 5189406, published Jul. 30, 1993.
Patent Abstracts of Japan, JP 6076161, published Mar. 18, 1994.
Patent Abstracts of Japan, JP 6149833, published May 31, 1994.
"SpaceRef.com", Space Shuttle Weather Launch Commit Criteria and KSC End of Mission Weather Landing Criteria, Jan. 29, 2000; 9 pages.

* cited by examiner

Shovel Weather Driven Demand

|            | Time Period 1 | Time Period 2 | Time Period 3 | Time Period 4 | Time Period 5 | Time Period 6 |
|------------|---------------|---------------|---------------|---------------|---------------|---------------|
| Location 1 | + 10%         | + 15%         | + 20%         | + 20%         | + 20%         | + 15%         |
| Location 2 | + 05%         | + 05%         | - 10%         | - 15%         | - 10%         | + 00%         |
| Location 3 | - 20%         | - 20%         | - 40%         | - 40%         | - 20%         | - 20%         |
| Location 4 | + 70%         | + 70%         | + 20%         | + 05%         | + 05%         | + 05%         |

FIG. 4

SYSTEMS AND METHODS FOR RECOMMENDING BUSINESS DECISIONS UTILIZING WEATHER DRIVEN DEMAND DATA AND OPPORTUNITY AND CONFIDENCE MEASURES

BACKGROUND OF THE INVENTION

1. Field of the Invention

The invention relates to business decision systems, and more particularly, to business decision systems and methods for recommending business decisions driven by weather elements.

2. Background of the Invention

The impact of weather is direct and dramatic on many facets of business and social life. As a result, many complex tools have been developed to forecast weather conditions. The Farmer's Almanac and the National Weather Service forecasts are two of the best known sources of weather forecasts. Business decisions are often influenced by these forecasts. These forecasts generally provide useful information that can help businesses and others make informed decisions regarding events or activities that are weather driven. Unfortunately, assessing weather forecast data, and generating a specific business action based on weather forecasts presents a daunting and complex challenge that prevents businesses from effectively using relationships between business activities and weather elements, and weather element forecasts to develop business actions.

Furthermore, while forecasts, such as those provided by Farmer's Almanac and the National Weather Service generally provide accurate forecasts, existing forecasting techniques are not perfect—nor will they likely ever be. Thus, business decisions based on weather forecasts are subject to the uncertainties associated with weather forecasts.

What is needed are cost effective systems and methods to generate business recommendations for specific business actions based on forecasted weather elements and relationships between a business activity and weather elements.

SUMMARY OF THE INVENTION

The invention is directed to systems and methods to generate business recommendations for specific business actions based on weather element forecasts and relationships between a business activity and weather elements. The system includes a confidence level filter, an opportunity matrix filter, a weather decision point generator, a business rule recommendation engine and a business rules knowledge database. In a further feature a graphical user interface and an interface to external databases is provided. The interfaces allow the system to be used across a network, such as the Internet.

Methods of generating business recommendations for business activities based on one or more weather elements are also provided. The methods include receiving a weather element relationship for a business activity and weather driven demand data for a set of time periods (e.g., a weeks, months, or seasons). The weather driven demand data provide an indication how a business activity will be influenced by one or more weather elements.

The method proceeds by assigning opportunity measures to each of the data points within the weather driven demand data, and identifying weather decision points based on opportunity measures associated with a weather driven demand data point. The assignment of opportunity measures includes assigning tags, such as high opportunity, low opportunity, high risk, and low risk to each weather driven demand data based on a set of opportunity matrix rules. The opportunity matrix rules contain a knowledge base generated from the study of historical business activity results that were influenced by weather elements.

The method then applies business weather rules to the weather decision points to generate business recommendations. The business weather rules provide specific actions, such as adding inventory or increasing markdowns.

In a further feature, a weather element relationship confidence level is assigned to each data point within the weather driven demand data. The strength of the confidence level is based on how strongly correlated a product's business activity results are related to weather elements. This confidence level is then factored in to determine the weather decision points. In another further feature, a weather element forecast confidence level is assigned to each data point within the weather driven demand data. This confidence level can also then be factored in to determine weather decision points.

The invention provides a cost effective system and method to generate business recommendations based on weather elements and relationships between a business activity and weather elements. The invention also provides an efficient approach to assessing the likelihood that a weather element forecast will be accurate.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical, or functionally or structurally similar elements. The drawing in which an element first appears is indicated by the left-most digit in the corresponding reference number.

FIG. 4 is a chart that illustrates example weather driven demand data, according to an embodiment of the invention.

DETAILED DESCRIPTION OF THE INVENTION

While the invention is described herein with reference to illustrative embodiments for particular applications, it should be understood that the invention is not limited thereto. Specifically, the invention is described herein primarily in the context of a retail environment. However, it should be understood that the invention can be adapted and envisioned for use in many other applications, including but not limited to, retail products and services; manufacturing/production (e.g., construction, utilities, movie production companies, advertising agencies, forestry, mining, and the like); transportation; the entertainment industry; the restaurant industry; consumer activities and/or events (e.g., golfing, skiing, fishing, boating, vacations, family reunions, weddings, honeymoons, and the like); and processing, valuating, and trading of financial instruments (e.g., options, futures, swaps, and the like). Those skilled in the art with access to the teachings provided herein will recognize additional modifications, applications, and embodiments within the scope thereof and additional fields in which the invention would be of significant utility.

Figure 1:
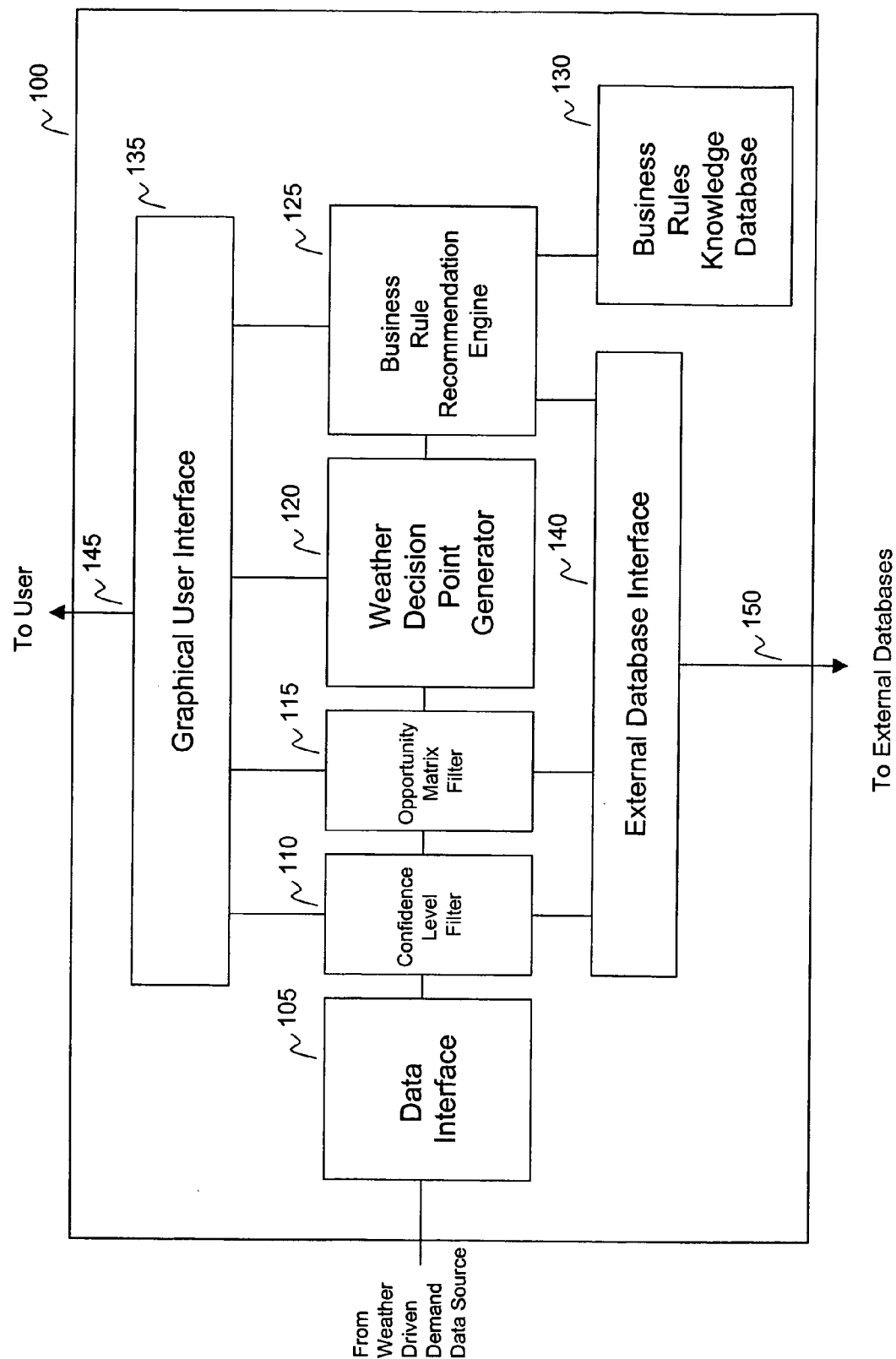
FIG. 1 is a diagram of a weather-based decision system, according to an embodiment of the invention.

FIG. 1 illustrates a weather-based decision system 100, according to an embodiment of the invention. Weather-based decision system 100 can be used to provide business recommendations. These recommendations are based on known relationships between weather elements and a business activity, weather forecasts, historical weather data, and business rules. In some cases, historical business activity data will be used to generate recommendations, while in others historical business activity data will not be used. As used herein, weather element can include any type of weather element, such as temperature, low temperature, high temperature, or level of precipitation.

The following are two high level examples of the types of business recommendations that weather-based decision system 100 can generate. Weather-based decision system 100 can be used to provide a business recommendation that advises a business to increase its inventory of boots for the coming fall. Alternatively, weather-based decision system 100 can be used to provide a recommendation that advises the planners of a series of outdoor concerts as to the potential number of attendees at the concerts.

In other cases weather-based decision system 100 can be used to generate very specific and extensive recommendations. For example, a national department store may desire to receive recommendations regarding inventory levels for the coming fall for their entire stock of outdoor clothing (e.g., women's boots, men's boots, men's sweaters, women's sweaters, men's outerwear, etc.) for hundreds of stores in locations throughout the United States. Ordinarily, providing such a recommendation would be a daunting task. While still complex, weather-based decision system 100 simplifies this task, organizes and prioritizes recommendations, and improves business efficiency. In particular, weather-based decision system 100 automates this process, leveraging known weather element relationships for the merchandise and an extensive knowledge base of business rules to generate a set of recommendations by product, date, and location with the ability to aggregate results within a geographic, time-based, product-based or combined geographic, time-based, and product-based hierarchy.

Throughout the discussions herein, the invention is primarily described in the context of business rules and recommendations. However, the invention is not limited to these examples and can be widely used to make business recommendations regarding a broad range of activities, including but not limited to, commercial sales, retail sales, manufacturing, and event planning. The invention can be used to support recommendations for any type of activity, provided that a weather element relationship for the activity is known. Furthermore, the invention can be used to provide business recommendations for any future time period. A time period can be a day, week, weekend, month, season, or any other time period for which weather element measurements or business activity data are available.

In the example of FIG. 1, weather-based decision system 100 includes data interface 105, confidence level filter 110, opportunity matrix filter 115, weather decision point generator 120, business rule recommendation engine 125, business rules knowledge database 130, and graphical user interface 135. Data interface 105 receives data regarding a known weather element relationship for a business activity. For example, the received data could include weather driven demand predictions for the sale of lawnmowers in Atlanta, Ga. for a future time period. Weather driven demand predictions can include a predicted expected sales increase or decrease in sales from last year for each day, or other time period, in the coming year.

In addition the received data can include measures of the strength of the weather element relationship for lawnmower sales. The weather element relationship for a business activity, such as the sale of lawnmowers, can be quite complex. In particular, sales of lawnmowers can be a function of the temperature and level of precipitation. The sales of lawnmowers can also be a function of many other factors, such as state of the economy, housing market, sales promotions, etc. which must be filtered out of the model to specifically identify weather element impacts. The function will vary over time, such that, high temperatures and high levels of precipitation in the Spring may stimulate lawnmower sales. Whereas, high temperatures in mid-Summer may diminish lawnmower sales. Examples of the measures of the strength of the weather element relationship can include the model error (e.g., % standard deviation, $R^2$, and Sig-F). Other received data can include the weather forecast for the weather elements used in the weather element relationship. Additional data needed by weather-based decision system 100 can be accessed through external database interface 140.

In one embodiment of weather-based decision system 100, data interface 105 will also be used to receive measures of confidence in the weather forecast for the weather elements. One type of confidence measure that can be received is a confidence level that the weather element forecast is correct, based on a comparison between the weather element forecast and a weather element prediction using trends in weather factor measurements. A weather element forecast is based on a weather forecast, such as Farmer's Almanac, the National Weather Service forecast or some other forecasting service. A weather element prediction, on the other hand, is based on examining trends in weather element measurements.

Confidence level filter 110 is an optional element within weather-decision based system 100 coupled to data interface 105 that filters the incoming received weather driven demand data to highlight those weather driven demands in which the highest level of confidence exists in the weather element relationship between business activity and the weather elements, and in the actual weather element forecast. For example, confidence level filter 110 can receive weather driven demand data for lawnmower sales for Atlanta throughout a future six-month period. Confidence level filter 110 examines each of the weather driven demand data points to assess the strength of the weather relationship for each time period (e.g., day, week, weekend) and to assess the confidence level in the forecasted weather element. Optionally, through the use of graphical user interface 135, filter settings can be set to determine which weather driven demands are highlighted based on the confidence level and strength of the weather relationship.

Opportunity matrix filter 115 is also used to highlight weather driven demand data to characterize the opportunity or risk associated with a particular weather driven demand data point. When confidence level filter 110 is used, data that has a low confidence level based on the weather element relationship and the confidence in the weather forecast can be removed or flagged as a high risk weather driven demand because of low confidence in the underlying values. System settings can be adjusted within weather-based decision system 100 as to how the confidence levels associated with confidence level filter 110 are factored into the decisions made by opportunity matrix filter 115.

The opportunity matrix filter 115 uses a set of opportunity matrix rules to further characterize the opportunity or risk associated with a particular weather driven demand point. The opportunity matrix filter contemplates employing standard and non-standard statistical measures that are used to control the determination of business opportunities or risks. For example, if a maximum value is exceeded, an opportunity could be generated. Conversely, if a minimum or lesser value is presented, a risk could be generated.

Weather decision point generator 120 is coupled to opportunity matrix filter 115, and is used to generate weather decision points. Weather decision points are weather driven demand data that are deemed to be relatively important, that is, data that indicate a period of time when a business recommendation should be made. For example, all weather driven demand data that were determined to be HIGH OPPORTUNITY or HIGH RISK may be determined to be weather decision points.

Business rule recommendation engine 125 is coupled to weather decision point generator 120, and is used to provide specific recommendations for a business activity based on the output of weather decision point generator 120 and rules contained within business rules knowledge database 130. In the context of retail sales, the business recommendation can address areas such as, but not limited to, excess inventory, stock out risk, allocation of inventory, product replenishment, price promotions, markdowns, display timing and media timing. For example, business rule recommendation engine 125 may receive weather decision points from weather decision point generator 120 that identify a period of four weeks in which lawnmower sales are predicted to be significantly higher. Business rule recommendation engine 125 would access business rule knowledge database 130 to identify any business rules that would apply to the particular situation. One such rule, might be to evaluate planned inventory levels and adjust them accordingly. Specifically, if the weather decision points showed that inventory would be short 1000 units, business rule recommendation engine 125 would generate a recommendation that inventory levels be increased.

Business rules knowledge database 130 contains a set of knowledge and experience based business rules that allow business rule recommendation engine 125 to generate business recommendations for weather decision points. Business rules within knowledge database 130 can be applied to circumstances when actual customer data is being used within weather-based decision system 100 or when customer data (or its surrogate) is unavailable.

In the case when actual customer data or syndicated data for a customer is used, one example of a quantitative business recommendation rule relates to awareness campaigns/marketing recommendations. (Syndicated data refers to industry data that is representative of customer data.) Awareness campaigns/marketing include any awareness type campaign that does not involve a price promotion. Examples would include radio advertising, TV advertising, print advertising and the like. The business recommendation rule defines specific criteria for the generation of when an awareness campaign should be conducted. Within a recommended period, the best week or weeks for conducting an awareness campaign are depicted with a number ranking scheme.

In the case where customer data (or a surrogate for customer data) is not used, example qualitative business rules can address seasonal merchandise sales, store traffic/transactions, media/marketing effectiveness, markdowns required, logistic surprises and energy consumption.

Graphical user interface 135 enables a user to control, view data and receive recommendations generated by weather-based decision system 100. Graphical user interface 135 is coupled through connection 145 to confidence level filter 110, opportunity matrix filter 115, weather decision point generator 120 and business rule recommendation engine 125. Connection 145 can be wired or wireless, and represent either a direct connection between a user and weather-based decision system 100 or a connection that traverses a local area network or the Internet.

External database interface 140 provides an interface to external databases that may be accessed to gather data to support weather-based decision system 100. Example databases that can be coupled to external database 140 include, but are not limited to, historical sales data for a product being considered, planned sales or inventory levels for a product being considered, weather forecast databases (e.g., Farmer's Almanac, National Weather Service forecast), historical weather element databases (e.g., daily temperatures for the past year, daily precipitation for the past year), and weather element prediction databases (e.g., weather elements predicted based on trends in weather element measurements).

Connection 150 exists between external database interface 140 and one or more external databases. Connection 150 may be wired or wireless, and can be directly coupled to a database or represent a local area network or Internet connection.

Figure 2:
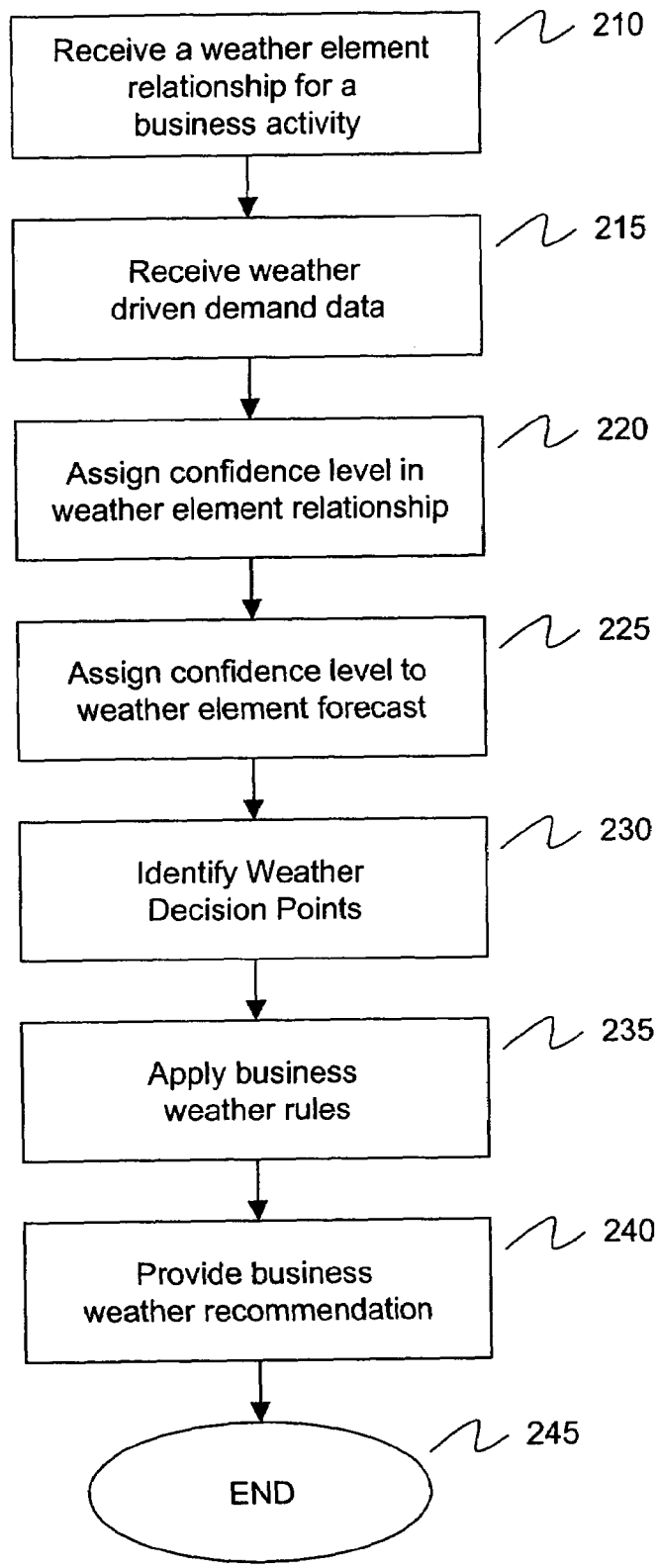
FIG. 2 is a flowchart of a method to generate business recommendations based on weather elements, according to an embodiment of the invention.

FIG. 2 provides a flowchart of method 200 to generate a business recommendation, according to an embodiment of the invention. Method 200 begins in step 210.

In step 210, a weather element relationship for a business activity is received. For example, weather-based decision system 100 can receive a weather element relationship from an external source through data interface 105. The weather element relationship provides measures of the confidence level associated with the weather element relationship. For example, the confidence level will identify how closely correlated is the sale of a product related to weather elements. In the case of winter jackets, the confidence level may be very high, while in the case of life insurance the confidence level may be low. That is, while winter jacket sales may be strongly influenced by temperature, life insurance sales may only be weakly related to weather elements.

In step 215, weather driven demand data is received for a set of time periods. Weather driven demand data can also be received, for example, through data interface 105 within weather-based decision system 100. As stated above, weather driven demand predictions can include a predicted expected sales increase or decrease in sales from last year for each day, or other time period, in the coming year. FIG. 4 provides a chart that illustrates example weather driven demand data that can be received. The chart illustrates weather driven demand for shovels for time period 1 through time period 6 for four geographic locations. Thus, for example, the weather driven demand for location 1 for Time Period 1 would be +10% above weather driven demand for shovels for Time Period 1 for the previous year. The time periods used can be any time period for which data is available (e.g., weeks, weekends, months, seasons). Associated with each weather driven demand would be a measure of the strength of the correlation between shovel sales and weather for that time period.

In step 220, a confidence level is assigned to the weather element relationship for the product being considered. For example, confidence level filter 110 can assign a confidence level. The assignment of a confidence level can be based on received data relating to confidence levels, computations made within the system to generate a confidence level, or a combination of these. The weather element relationship confidence level provides one way in which weather driven data can be filtered to identify those weather driven demands that should be acted upon. One example of how the confidence level can be assigned is based on the strength of the correlation between weather elements and the product being considered for each time period (e.g., a day, a week, etc.). When a correlation is weak, less confidence exists in the estimate for the weather driven demand. Therefore, weather-based decision system 100 would be less likely to provide a business recommendation for that weather driven demand.

In step 225, a confidence level is assigned to a weather element forecast. For example, confidence level filter 110 can provide a weather element forecast confidence level to a weather driven demand data point. The assignment of a confidence level can be based on received data relating to confidence levels, computations made within the system to generate a confidence level, or a combination of these. One method of assigning a confidence level is based on using trends in weather element measurements.

In step 230, weather decision points are identified. For example, opportunity matrix filter 115 can flag weather driven demand data as representing an opportunity or not, while weather decision point generator 120 examines these opportunity characterizations along with the confidence levels in the weather driven demand data to identify weather decision points. As stated above, weather decision points are those weather driven demand data that are deemed to be important, that is, data that indicate a period of time when a business recommendation should be made. In one embodiment, weather decision points are determined by examining the weather relationship confidence level, the weather element confidence level and the opportunity matrix rules described above. In alternative embodiments, weather decision points can be identified by using any one or combination of these factors. Through use of a graphical user interface, such as graphical user interface 135, weather decision points can be highlighted by, for example, color coding cells in the chart in FIG. 4 to be displayed within graphical user interface 135.

In step 235, business weather rules are applied. For example, business rule recommendation engine 125 can apply business rules from a business rules knowledge database, such as business rule knowledge database 130 to generate specific business recommendations. In one embodiment, these recommendations are based on the use of actual sales or activity data for a product being considered. In another embodiment, actual data is not used and qualitative business recommendations can be generated.

In step 240, business recommendations driven by weather elements are provided. For example, graphical user interface 135 can output business recommendations to a user based on the recommendations generated in step 235. In step 245, method 200 ends.

Figure 5:
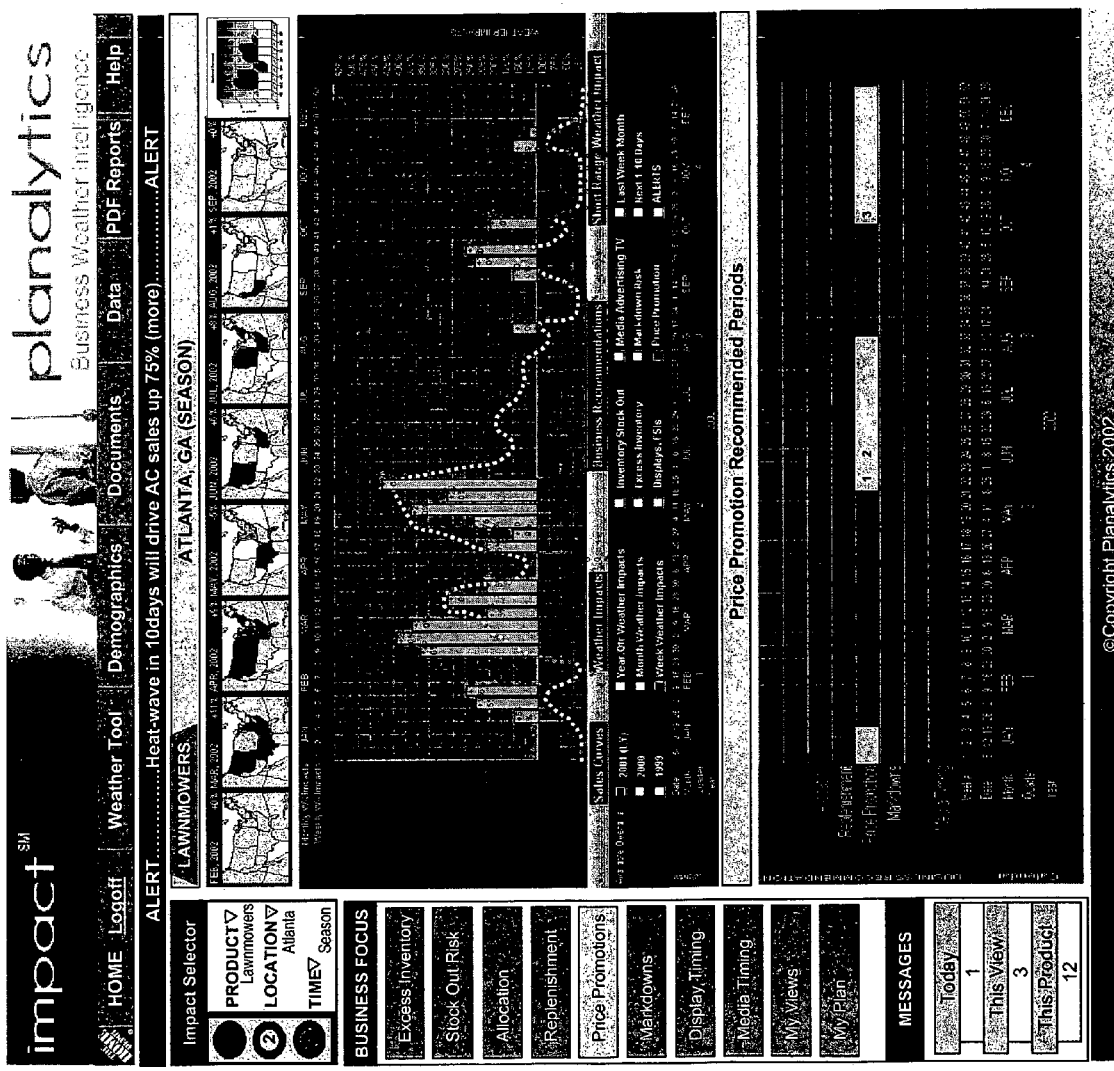
FIG. 5 is a chart that illustrates an example output showing a business recommendation related to price promotions, according to an embodiment of the invention.
Figure 6:
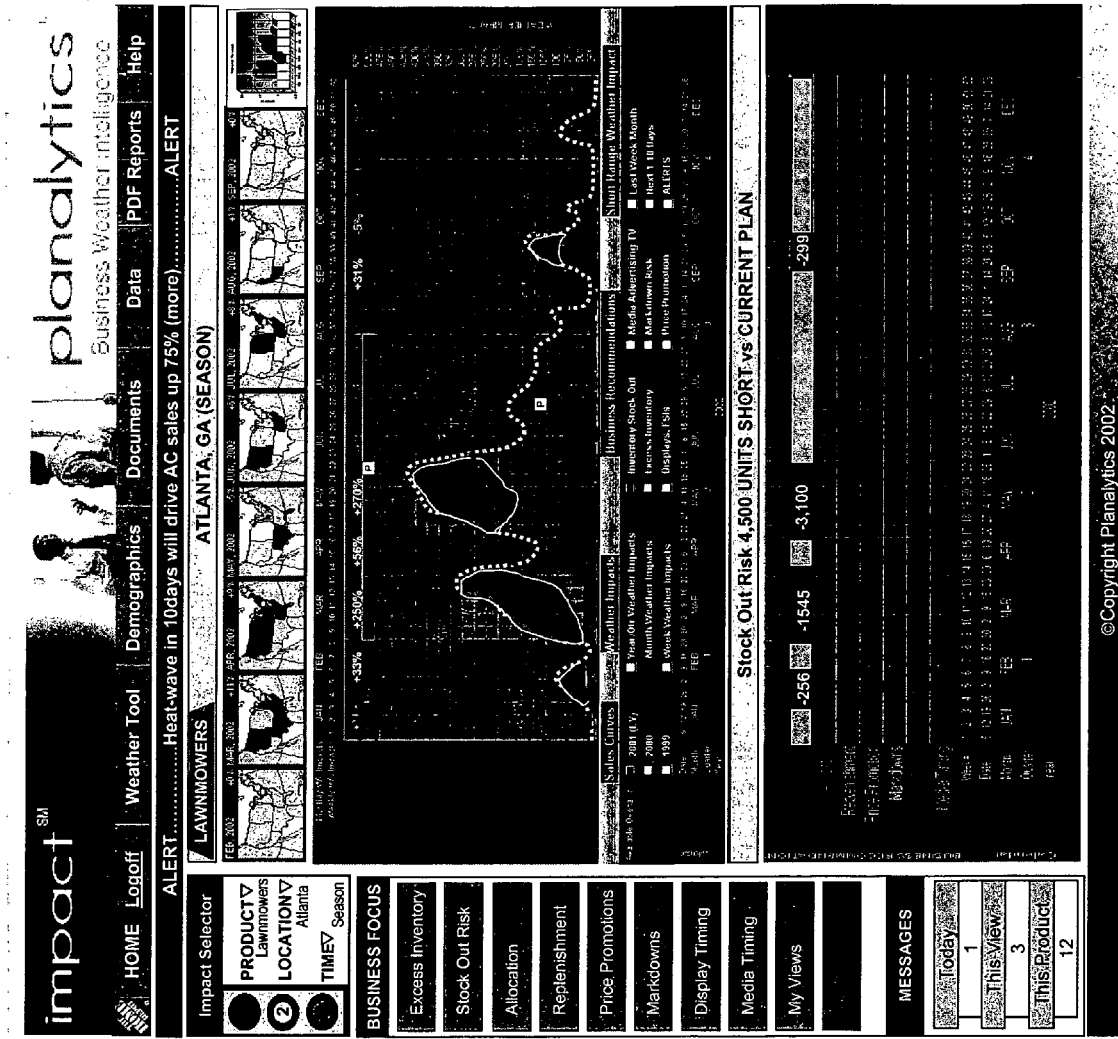
FIG. 6 is a chart that illustrates an example output showing a business recommendation related to inventory allocation, according to an embodiment of the invention.

Example outputs that can be generated by, for example, graphical user interface 135 are illustrated in FIGS. 5 and 6.

FIG. 5 illustrates graph 510 and recommendation chart 520 for lawnmower sales in Atlanta. Graph 510 shows a bar chart of weather driven demand mapped against last years sales activity for lawnmowers. Recommendation chart 520 recommends four price promotion periods.

FIG. 6 illustrates graph 610 and recommendation chart 620 for lawnmower inventory for a store in Atlanta. Within graph 610, line 635 shows the current inventory allocation plan for lawnmowers. Line 640 shows the projected inventory needs based on weather driven demand data. Shaded areas 642, 644, 646 and 648 highlight potential inventory shortages. Recommendation chart 620 provides recommendations for increasing inventory levels, where potential stock out risks exist.

Figure 3:
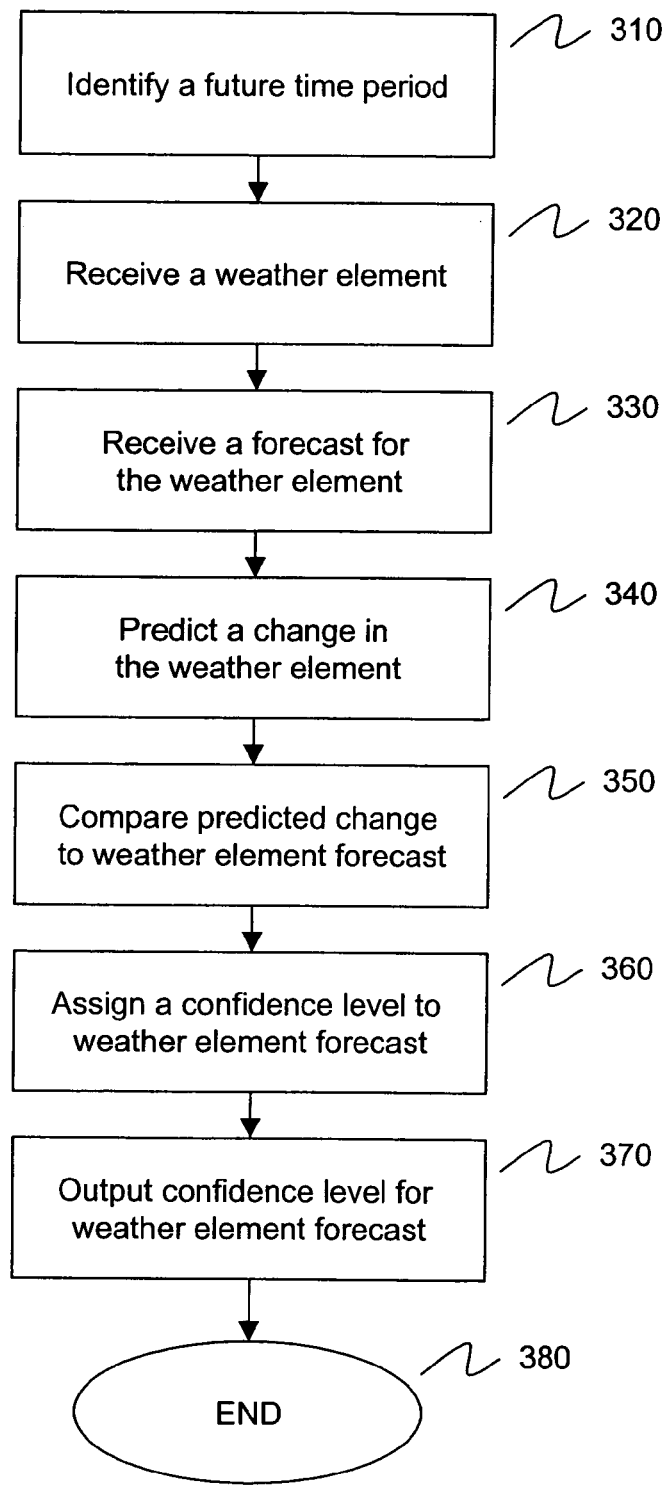
FIG. 3 is a flowchart of a method that uses trends in weather elements to assign a confidence level to a weather element forecast, according to an embodiment of the invention.

FIG. 3 provides a flowchart of method 300 that assigns a confidence level to a weather element forecast for use to develop business recommendations, according to an embodiment of the invention. Method 300 begins in step 310. In step 310 a future time period is received. In step 320, a weather element is received. Alternatively, more than one weather element can be received. In step 330, a forecast for the weather element is received. The weather element forecast can, for example, be based on the Farmer's Almanac, the National Weather Service forecast or another source.

In step 340, a change in the selected weather element is predicted. For example, a prediction could be based on trends in weather elements from one year to the next.

In step 350, the predicted weather element change is compared to the weather element forecast to determine the relationship between the predicted weather element change and the weather element forecast. For example, if the predicted weather element change was that the temperature was going to be warmer on a future time period compared to last year for that time period, but the forecasted temperature was less than last year then it would be determined that the predicted and forecasted temperature were inconsistent. In a further embodiment, relative magnitudes of the differences can be determined. For example, the difference leading to the inconsistency between the predicted and forecasted results could be based on a single degree to many degrees.

In step 360, a confidence level is assigned to the weather element forecast based on the comparison with the predicted weather element change. For example, if step 340 predicted that a temperature would be warmer for the future time period and the weather forecast also forecast that the temperature would be warmer, then a high level of confidence would be assigned to the weather forecast that it was correct. The level of confidence would be based on the strength of the particular method to predict a change in the weather element that was used.

In an alternative embodiment, the weather element forecast could be compared to results from multiple methods to predict changes in weather elements. In this case, a weighting could be assigned to each of the methods for predicting changes in weather elements, such that the confidence level assigned to the weather element forecast was a function of these weightings and whether they were consistent with the weather element forecast.

For example, if all three methods to predict changes in the weather were used, and all three produced a result that was in agreement with the weather element forecast, a high level of confidence would be assigned to the weather element forecast. If some methods produced results that agreed with the weather element forecast and others did not, the confidence level would be lower. This confidence would be a function of the individual confidence levels associated with each method and the weighting provided to each method.

In step 370, a confidence level associated with the weather element forecast is output. The output confidence level can be used from Step 360. In step 380, method 300 ends.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A weather-based decision system for providing business recommendations based on a set of weather driven demand data, comprising:
   a confidence level filter configured to assign a first confidence level to data within the set of weather driven demand data based on a probability that a weather element forecast is accurate and a second confidence level to said data within the set of the weather driven demand data based on a strength of a correlation between a product or service being considered and one or more weather elements;
   an opportunity matrix filter coupled to said confidence level filter and configured to assign an opportunity level to said data within the set of weather driven demand data based upon said first confidence level and said second confidence level;
   a weather decision point generator coupled to said opportunity matrix filter and configured to identify a weather driven demand data point of said data within the set of the weather driven demand data as a weather decision point;
   a business rule recommendation engine coupled to said weather decision point generator and configured to provide a business recommendation; and
   a business rules knowledge database coupled to said business rule recommendation engine and configured to contain business rules;
   wherein the weather driven demand data indicates how a business activity is influenced by said one or more weather elements.

2. The weather-based decision system of claim 1, further comprising a graphical user interface configured to display the weather driven demand data, said weather decision points, and said business recommendation.

3. The weather-based decision system of claim 1, further comprising an external database interface configured to access one or more external databases.

4. The weather-based decision system of claim 1, wherein said weather decision point generator is configured to identify said weather decision point by examining said first confidence level, said weather element forecast, and said opportunity level for said weather driven demand data point.

5. The weather-based decision system of claim 1, wherein said probability is based on a relationship between the weather element forecast and at least one weather element prediction.

6. The weather-based decision system of claim 5, wherein said at least one weather element prediction is based upon trends in weather element measurements.

7. A method of generating a business recommendation for a business activity based on one or more weather elements, comprising:
   (a) receiving weather driven demand data for a set of time periods;
   (b) assigning a first confidence level to the weather driven demand data based on a strength of a correlation between a product or service being considered and the one or more weather elements;
   (c) assigning a second confidence level to the weather driven demand data based on a probability that a weather element forecast is accurate;
   (d) assigning an opportunity level to the weather driven demand data based upon the first confidence level and the second confidence level;
   (e) identifying a weather driven demand data point of the set of the weather driven demand data as a weather decision point based on the first confidence level, the second confidence level, and the opportunity level associated with the weather driven demand data point; and
   (f) applying business weather rules to the weather decision point identified in step (e), thereby generating the business recommendation;
   wherein the weather driven demand data indicates how the business activity is influenced by the one or more weather elements.

8. The method of claim 7, wherein step (a) comprises:
   receiving a plurality of weather element relationships for the business activity.

9. The method of claim 7, further comprising:
   (g) assigning the first confidence level by a geographic location for the weather driven demand data, wherein step (e) further comprises using the first confidence level to identify the weather decision point.

10. The method of claim 7, further comprising:
    (g) assigning the first confidence level by a time period for the weather driven demand data, wherein step (e) comprises using the weather first confidence level to identify the weather decision point.

11. The method of claim 7, further comprising:
    (g) assigning the second confidence level by a geographic location, wherein step (e) comprises using the second confidence level to identify the weather decision point.

12. The method of claim 7, further comprising:
    (g) assigning the second confidence level by a time period, wherein step (e) further comprises using the second confidence level to identify the weather decision point.

13. The method of claim 7, wherein step (e) further comprises using opportunity matrix rules generated from historical business activity results that were influenced by the one or more weather elements to provide the opportunity level.

14. The method of claim 7, wherein step (c) further comprises using a relationship between a weather element forecast and at least one weather element prediction to determine the second confidence level.

15. The method of claim 14, wherein step (c) further comprises using trends in weather element measurements to determine the at least one weather element prediction.

* * * * *